Nov. 29, 1938.                G. E. HOUPLAIN                2,138,547
                         PNEUMATIC BRAKING DEVICE
                           Filed March 5, 1937                2 Sheets-Sheet 1
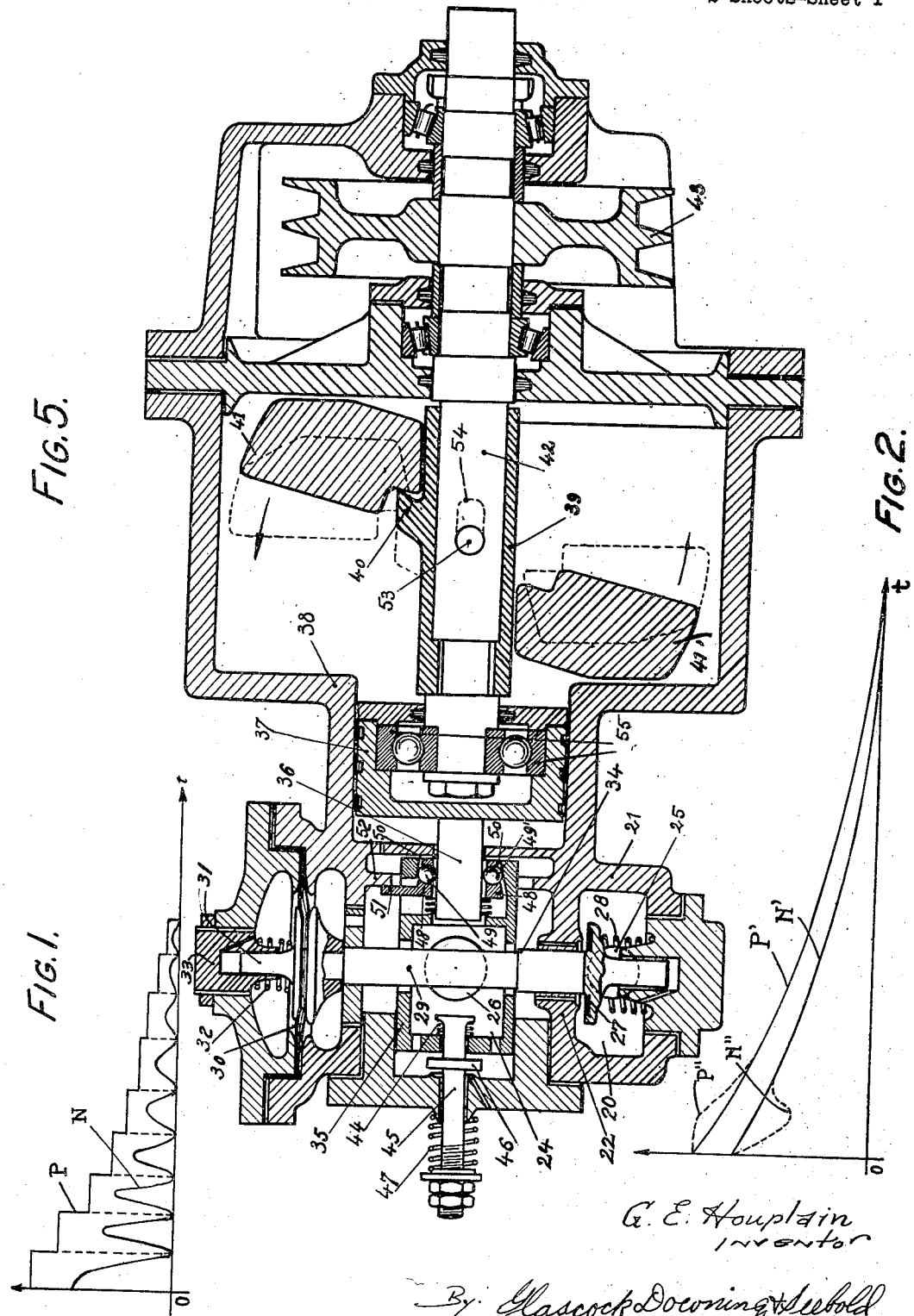

Nov. 29, 1938.   G. E. HOUPLAIN   2,138,547
PNEUMATIC BRAKING DEVICE
Filed March 5, 1937   2 Sheets-Sheet 2
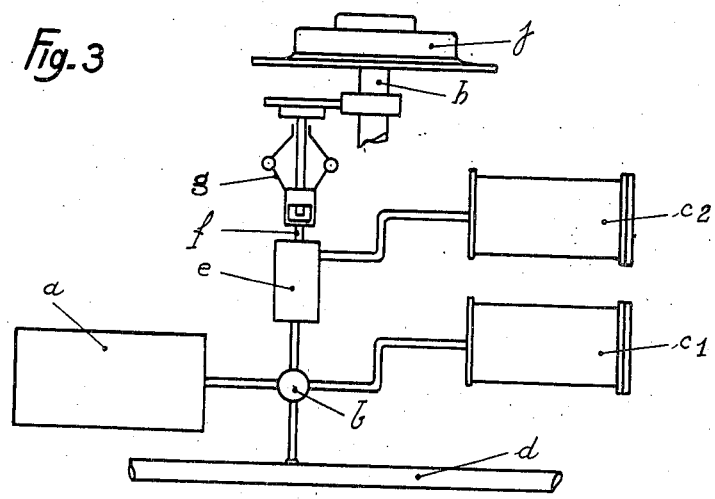
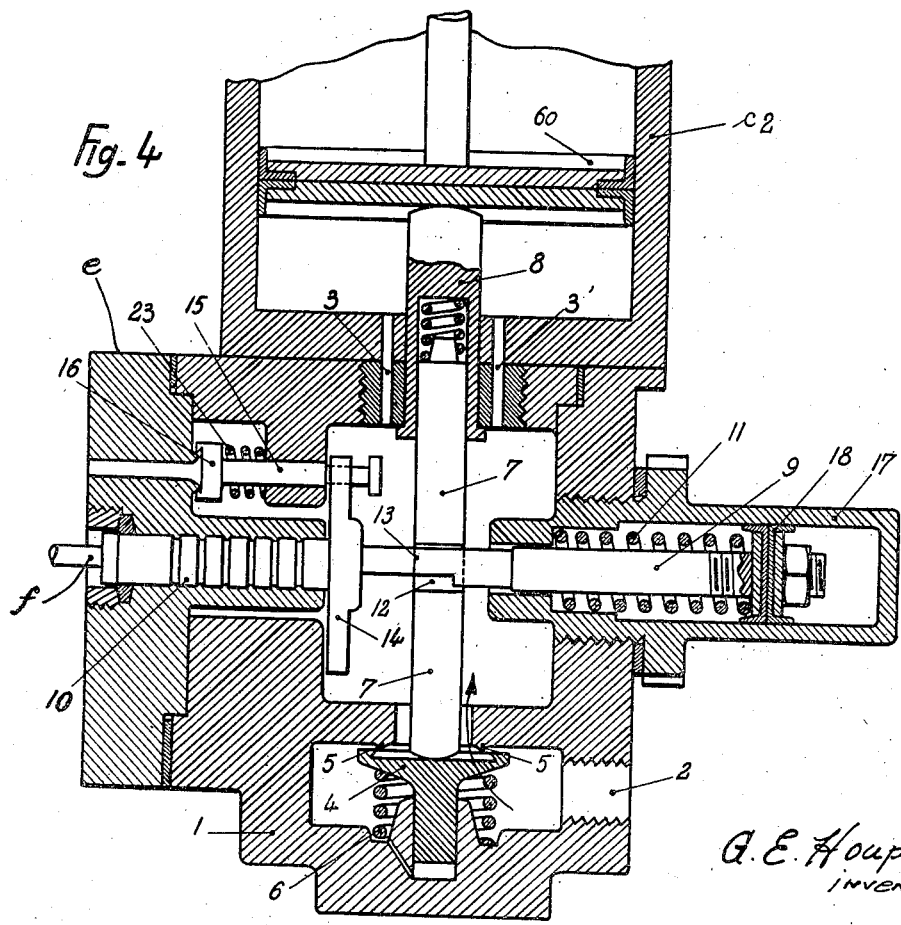
G. E. Houplain
inventor
by Glascock Downing & Seebold
Attys.

Patented Nov. 29, 1938

2,138,547

UNITED STATES PATENT OFFICE 2,138,547

PNEUMATIC BRAKING DEVICE

Georges Emile Houplain, Paris, France

Application March 5, 1937, Serial No. 129,260
In France March 7, 1936

8 Claims. (Cl. 188—181)

The present invention relates to a pneumatic braking device particularly applicable to rail vehicles, of the type in which the braking force is controlled by a centrifugal governor actuated by the wheels of the vehicle. The invention concerns in particular a device of this type which has been described in my co-pending U. S. A. patent application Serial No. 691,216 and in which the governor causes at the instant when the wheels slow up a permanent interruption of the supply of compressed air to the brake cylinder, and, at the instant when the wheels tend to become locked, the momentary opening of an outlet valve which closes again as soon as the wheels begin to rotate again at their normal speed owing to the decrease of the braking force due to the drop in pressure in the brake cylinder, and again opens as soon as the wheels tend to become locked. As a result, the braking force decreases in a discontinuous manner during the slowing up of the vehicle and can be shown as a function of the time by the diagram in steps P shown in Fig. 1, in which each vertical drop in the braking force corresponds to a locking of the wheels, whereas the speed of rotation of the wheels can be shown for the same period by the curve N.

The improvement which is the object of the present invention is intended to still further smooth the braking by preventing the successive locking of the wheels and it is characterized by the fact that the outlet valve of the brake cylinder is controlled by the displacements of a piston on which centrifugal force and the pressure of the compressed air contained in the cylinder act in opposite directions.

Owing to this improvement, the braking force will always be proportional to the speed of rotation of the wheel. As a result, the braking force and the speed or rotation of the wheels will vary during the slowing up period according to the curves P' and N' of Fig. 2 so that the braking is effected in an extremely gentle and progressive manner.

By way of example, two embodiments of the device according to the invention have been described hereinafter and illustrated in the accompanying drawings.

Figs. 1 and 2 are diagrams illustrating the principle of the invention which has been set forth above.

Fig. 3 is a diagrammatic view of the complete braking device.

Fig. 4 is a sectional elevation of the control device.

Fig. 5 shows in sectional elevation a second improved embodiment of the device.

In the diagrammatical view of Fig. 3, $a$ is the auxiliary compressed air reservoir feeding the main braking cylinder $c_1$ and the auxiliary braking cylinder $c_2$ through the usual triple valve $b$ actuated in the usual manner by the air pressure of the general conduit $d$. The pressure in the auxiliary braking cylinder $c_2$ is further controlled by a special control valve $e$ which is actuated by means of a rod or cable $f$ by a centrifugal governor $g$ driven by the axle $h$ of the wheel $j$ of the vehicle. The main cylinder $c_1$ supplies a braking force which is adjusted in the known manner, whereas the auxiliary cylinder $c_2$ which is controlled by the centrifugal governor only supplies the complement necessary for obtaining a complementary braking. The control device (Fig. 4) comprises a valve body 1 provided on the one hand with an orifice 2 connected to the compressed air supply pipe, and, at its upper part, with orifices 3, 3' through which it communicates with the auxiliary braking cylinder $c_2$ on which it is directly mounted. On the path of the compressed air which penetrates into the valve 1 through the orifice 2, is placed an inlet valve 4, which is urged towards its seat 5 by a spring 6, but which is held away from said seat, so long as the compressed air is not sent into the valve, by a push rod 7 on which a rod 8 secured to the piston 60 of the brake cylinder bears in the inoperative position.

Inside the valve is slidably mounted a rod 9 which is controlled, for example through the instrumentality of a cable 10, by a centrifugal governor which displaces said rod 9 towards the left when the vehicle is in motion and allows it to return towards the right, under the action of the retracting springs 11, when the speed of rotation of the wheels becomes nil. The rod 9 passes through a hole 12 in the push rod 7 and over a portion 13 of its length it is of smaller diameter. On the other hand, said rod 9 carries a part 14 which actuates with a certain play the stem 15 of an outlet valve 16. This device operates in the following manner: when the vehicle is in motion and the brake is off, the valve 4 is on the one hand held away from its seat by the piston of the brake cylinder, and, on the other hand locked in this position by the rod 9 which is at this instant urged towards the left. At the instant when the brake is applied, the compressed air is sent by the valve into the cylinder $c_2$ and pushes the piston 60 of same upwards, the valve 4 only being held open by the rod 9. At the instant when, responsive to the braking thus produced, the speed of rotation of the wheels decreases, the rod 9 moves towards the right and unlocks the valve 4 which closes, cutting off the supply of compressed air to the cylinder. If the wheels have a tendency to lock, the rod 9 moves further towards the right and causes the outlet valve 16 to open. If, owing to the resultant decrease in the braking force, the wheels of the vehicle begin to rotate again, the rod 9 returns to the right, allowing the valve 16 to close again. If a tendency to lock again occurs, the rod 9 again causes said valve to open and so forth until the braking is completed, the inlet valve 4 remaining closed throughout the whole of this period.

In the device previously described by the inventor, the outlet valve 16 is only uncovered at the instant when a deadlock occurs, thereby producing an operation as shown in Fig. 1 and hereinbefore explained.

According to the present invention, the control device 1 furthermore includes a cylinder 17 communicating with the inside of said device and consequently with the brake cylinder, and in which moves a piston 18 fixed on the rod 9 which is controlled by the centrifugal governor. The compressed air contained in the brake cylinder acts on the piston 18 in the opposite direction to that of centrifugal force which is therefore at every instant balanced by the air pressure in the cylinder. On the other hand, the play with which the actuating rod 9 acts on the outlet valve 16 is just sufficient to enable said rod to unlock the inlet valve 4, any subsequent displacement of the rod 9 towards the right causing the outlet valve 16 to open.

This device enables a progressive braking to be obtained without locking the wheels, since the air pressure in the brake cylinder and consequently likewise the braking force, is automatically adapted to the speed of rotation of the wheels. In fact, as soon as, owing to the application of the brake, the vehicle slows up to some extent, centrifugal force decreases and the air pressure acting on the piston 18 moves the rod 9 towards the right causing the inlet valve 4 to close. From this instant, any decrease in the speed of rotation of the wheel of the vehicle which produces a corresponding decrease of centrifugal force, will cause the outlet valve to open and said valve will remain open until the air pressure in the brake cylinder decreases sufficiently for the action of centrifugal force on the piston 18 to again become greater than that of the air pressure, so that the rod 9 again moves towards the left, and allows the valve 16 to close again.

It ensues that theoretically, the pressure in the brake cylinder should decrease in small successive steps and the speed should oscillate slightly on either side of a constantly decreasing mean value. However, owing to the high frequency and the small amplitude of the oscillations of the outlet valve and also owing to the inertia of the members, the practical operation of the device ensures a slight and continuous outlet which has the effect of lowering the pressure and the speed according to the curves P' and N' of Fig. 2, without any perceptible jerks or oscillations.

In order that the operation of the apparatus may be thoroughly understood, it will be assumed that with the two cylinders receiving the full pressure the total braking force can attain for example 200% of the total weight of the vehicle and examination will be made of that will occur, (1) in the case in which said braking force can be obtained without locking the wheels, (2) in the case in which on the contrary such force would be too great, for any reason whatsoever.

In the first case, as the braking force is exerted, the vehicle slows up, centrifugal force decreases with the speed and the action of the pressure on the piston 18 becomes preponderant; the rod 9 therefore moves towards the right and the valve 4 is seated, then as the speed continues to decrease the air escapes from the second cylinder through the valve 16 as the speed decreases according to the curve N' of Fig. 2.

In the second case, the compressed air coming from the first cylinder is introduced through the valve 4 but as the pressure in the second cylinder tends to become too high, the rotation of the wheel decreases and likewise centrifugal force; consequently the pressure produced by centrifugal force cannot balance that produced by the compressed air on the piston 18. At this instant, the rod 9 moves towards the right, the valve 4 closes and the compressed air is exhausted through the valve 16. The tendency to lock results in a slight oscillation N'' in the speed and a slightly sharper drop P'' in the pressure, without however its being possible for locking to actually occur, owing to the quick action of the outlet valve, then everything proceeds as in the first case and the speed decreases according to the curve N'.

The braking force is therefore a function not only of the speed but also of the coefficient of friction of the wheels on the rail which does not allow the wheel to have a speed of rotation corresponding to the maximum force.

The above described embodiment which is illustrated in Fig. 3 requires the valve to be mounted directly on an auxiliary brake cylinder. It ensues on the one hand that it is necessary to connect the control rod of said valve to the centrifugal governor which is adjacent one of the axles by means of a preferably flexible transmission which is fairly long and likely to acquire a considerable play. Furthermore, in the case in which the vehicle has a plurality of brake cylinders, it is necessary to provide as many control devices and auxiliary brake cylinders as there are main cylinders.

The improved device shown in Fig. 5 has for its object to overcome this drawback and it is characterized by the fact that the inlet valve of the control device is actuated by a piston or a diaphragm on one face of which the air pressure of the braking cylinder or cylinders acts in the direction of closing of said valve, whereas on its other face a spring, adjusted so as to compensate for the air pressure corresponding to the slippage limit of the wheels on the rail, acts in the opposite direction.

It is obvious that if it is desired to use this device on a vehicle having a plurality of brake cylinders, it suffices to mount the above described device on the common supply pipe of said cylinders.

Referring to the drawings, it will be seen that the control device comprises a casing 21 divided by a partition 22 into two chambers 20 and 24, the first of which communicates through the orifice 25 with the compressed air pipe leading from the reservoir, and the second of which communicates through the orifice 26 with the pipe leading to the braking cylinders, the communication between said two chambers being ensured by the inlet valve 27 provided with a retracting spring 28. In the inoperative position, the valve 27 is held away from its seat by a push rod 29 of which the displacements are guided in the chamber 20 and which is actuated by a flexible diaphragm 30, on the other face of which acts another push rod 31 actuated by a spring 32 of which the tension can be adjusted by means of the nut 33, and which is adjusted, according to the load of the vehicle, to exert on the diaphragm 30 a force equal to that of the air pressure in the cylinders corresponding to the slippage limit of the wheels on the rail.

The push rod 29 is furthermore locked, in the position corresponding to the opening of the valve 27, so long as the speed of the wheel is sufficient, through the instrumentality of the stop 34, by a part 35 connected by means of a device which will be described hereinafter, to a control rod 36 which carries on the one hand a piston 37 which is displaceable in a cylinder 38 communicating with the chamber 24 of the valve 21, and on the other hand, a sleeve 39 on the stop 40 of which act the centrifugal masses 41, 41' of the governor which oscillate on their drive shaft 42 itself rotated by the grooved pulley 43 driven from an axle of the vehicle by means of a cable.

The locking part 35 actuates at the same time, by compressing a small spring 44, the rod 45 of an outlet valve 46 provided with a retracting spring 47.

The operation of the device is as follows: the vehicle being at rest and the brakes off, the valve 27 is held open under the action of the push rod 29 which is urged downwardly by the spring 32 through the instrumentality of the diaphragm 30, whereas the control rod 36 is in its extreme right hand position.

As soon as the vehicle starts moving, the rod 36 is displaced towards the left and, through the instrumentality of the part 35 and the stop 34, locks the push rod 29 in the open position of the valve 27.

If, while the vehicle in moving, the brakes are applied by sending compressed air into the cylinders, the slowing up of the wheels will have the effect of releasing the push rod 29, because as the action of the compressed air becomes greater than that of the centrifugal masses 41, 41', the rod 36 and the part 35 will move towards the right. However, if the braking is moderate, that is to say if the pressure in the brake cylinders does not exceed the value corresponding to the slippage limit, the inlet valve 27 remains open. On the other hand, if the braking is violent, the action of the air presure becomes greater than that of the spring 32, the diaphragm 30 is bent upwards, no longer acts on the push rod 29, and the inlet valve 27 closes under the action of its retracting spring 28 and the supply of the cylinders is cut off once and for all until the end of the braking period. In this case, a tendency of the wheels to lock will cause a sufficient displacement of the control rod 36 towards the right to open the outlet valve 46, and everything then proceeds as in the device of Fig. 3.

To make the device for releasing the push rod 29 which actuates the inlet valve 27 more sensitive and quicker acting, the part 34 is coupled to the control rod 36 by a ball wedging device comprising a conical part 48 in housings of which are arranged balls 49, 49' . . . in contact on the one hand with the rod 36 and, on the other hand with a conical bore 50 provided at the end of the part 34. Under these circumstances, if the rod 36 moves towards the right under the predominant action of the air pressure in the cylinders, the balls 49, 49' instantly jam and the part 34 is carried along, releasing the push rod 29.

On the other hand, if the rod 36 moves towards the left under the predominant action of centrifugal force, the balls are released and the part 34 is in this case carried towards the left by the retracting spring 47 of the outlet valve 46.

When the rod 36 reaches its extreme right hand position, the ball wedging device is released by an appendix 51 of the part 48 which strikes a stop 52 secured to the casing of the valve, the striking of the appendix 51 against the stop 52 results in the displacement of the part 48 towards the left in respect to the part 35, the balls 49, 49' being thus moved into the larger part of the conical bore 50 where they are released.

The sleeve 39 which is actuated by the centrifugal masses, is preferably secured against rotation on the shaft 42 of the governor by means of a pin 53 sliding in a groove 54 of said shaft, said sleeve 39 being secured against axial displacements with respect to the piston 37 and the rod 36 by means of a ball thrust bearing 55.

What I claim is:

1. In a pneumatic braking system for railways and the like, a braking cylinder, a device for controlling the braking effort produced by said cylinder and comprising an inlet valve and an outlet valve, a centrifugal governor actuated by the wheel of the car, means for maintaining the inlet valve open by this centrifugal governor when the speed of rotation of the wheel is sufficiently high and for setting this valve free when the speed decreases, means for maintaining this valve closed as soon as it has been set free, a piston controlling the opening of the outlet valve, means for actuating said piston in opposite directions by the air pressure and by the centrifugal governor.

2. In a pneumatic braking system for railways and the like, a braking cylinder, a device for controlling the braking effort produced by said cylinder and comprising an inlet valve and an outlet valve, a centrifugal governor actuated by the wheel of the car, a rod sliding in the body of the control device, means for controlling the displacements of this rod by the centrifugal governor, a piston on this rod, means for actuating this piston by the air pressure in a direction opposite to that of the action of the centrifugal governor upon the rod, means for locking the inlet valve in its open position by this rod when the speed of rotation of the wheel is sufficiently high, a spring disposed in a manner to close the inlet valve when said rod sets this valve free at a decrease of the speed, and means for controlling by said sliding rod the opening of the outlet valve.

3. In a pneumatic braking system for railways and the like, a braking cylinder, a device for controlling the braking effort produced by said cylinder and comprising an inlet valve and an outlet valve, a centrifugal governor actuated by the wheel of the car, a rod sliding in the body of the control device, a cylinder opening into said body, a piston carried by said rod and movable in said cylinder, means for actuating said sliding rod by the centrifugal governor in a direction opposite to that of the action of the air pressure upon the piston, means for locking the inlet valve in its open position by the sliding rod when the speed of rotation of the wheel is sufficiently high, means for maintaining the inlet valve in the open position by the piston of the braking cylinder when the brake is released, a spring disposed in a manner to close the inlet valve when said rod sets this valve free at a decrease of the speed, and means for controlling by said sliding rod the opening of the outlet valve.

4. In a pneumatic braking system for railways and the like, a braking cylinder, a device for controlling the braking effort produced by said cylinder and comprising an inlet valve and an outlet valve, a centrifugal governor actuated by the wheel of the car, a rod sliding in the body of the control device, a cylinder opening into said body, a piston carried by said rod and movable in said cylinder, means for actuating said sliding rod by the centrifugal governor in a direction opposite to that of the action of the air pressure upon the piston, means for locking the inlet valve in its open position by the sliding rod when the speed of rotation of the wheel is sufficiently high, means for maintaining the inlet valve in the open position by the piston of the braking cylinder when the brake is released, a spring disposed in a manner to close the inlet valve when said rod sets this valve free at a decrease of the speed, and means for controlling by said sliding rod the opening of the outlet valve with an amount of play enabling the inlet valve to be unlocked before the opening of the said outlet valve.

5. In a pneumatic braking system for railways and the like, a braking cylinder, a device for controlling the braking effort produced by said cylinder and comprising an inlet valve and an outlet valve, a centrifugal governor actuated by the wheel of the car, a rod sliding in the body of the control device, a cylinder opening into said body, a piston carried by said rod and movable in said cylinder, means for actuating said sliding rod by the centrifugal governor in a direction opposite to that of the action of the air pressure upon the piston, means for locking the inlet valve in its open position by the sliding rod when the speed of rotation of the wheel is sufficiently high, a spring disposed in a manner to close the inlet valve when said rod sets this valve free at a decrease of the speed, means operated by the air pressure and controlling the closing of said valve when the brake is operated, a spring opposed to said controlling means and maintaining the inlet valve in its open position when the brake is released, and means for controlling by said sliding rod the opening of the outlet valve.

6. In a pneumatic braking system for railways and the like, a braking cylinder, a device for controlling the braking effort produced by said cylinder and comprising an inlet valve and an outlet valve, a centrifugal governor actuated by the wheel of the car, a rod sliding in the body of the control device, a cylinder opening into said body, a piston carried by said rod and movable in said cylinder, means for actuating said sliding rod by the centrifugal governor in a direction opposite to that of the action of the air pressure upon the piston, means for locking the inlet valve in its open position by the sliding rod when the speed of rotation of the wheel is sufficiently high, a spring disposed in a manner to close the inlet valve when said rod sets this valve free at a decrease of the speed, a flexible diaphragm forming one of the walls of the body of the control device, a rod integral with the inlet valve, the end of said rod contacting the inner face of said diaphragm, a spring acting on the outer face of said diaphragm, means for adjusting the tension of said spring for maintaining the inlet valve in its open position when the brake is released, and means for controlling by the sliding rod the opening of the outlet valve.

7. In a pneumatic braking system for railways and the like, a braking cylinder, a device for controlling the braking effort produced by said cylinder and comprising an inlet valve and an outlet valve, a centrifugal governor actuated by the wheel of the car, a rod sliding in the body of the control device, a cylinder opening into said body, a piston carried by said rod and movable in said cylinder, means for actuating said sliding rod by the centrifugal governor in a direction opposite to that of the action of the air pressure upon the piston, a member movable inside the control device and pushed by the said rod in the direction corresponding to a decrease of the speed, a ball locking device between this movable member and this sliding rod disposed in a manner to render this movable member integral with this rod for one direction of the displacement of the rod corresponding to a decrease of the speed, means for locking the inlet valve in its open position by said movable member when the speed is sufficiently high, a spring provided in a manner to close the inlet valve when the latter is set free by the said member on the occurrence of a decrease of the speed, a flexible diaphragm forming one of the walls of the body of the control device, a rod integral with the inlet valve, the end of said rod contacting the inner face of said diaphragm, an adjustable spring acting on the outer face of said diaphragm in a manner to maintain the inlet valve open when the brake is released, means for coupling the said movable member to the outlet valve of the control device with an amount of play enabling said inlet valve to be unlocked before the opening of the outlet valve.

8. In a pneumatic braking system for railways and the like, a braking cylinder, a device for controlling the braking effort produced by said cylinder and comprising an inlet valve and an outlet valve, a centrifugal governor actuated by the wheel of the car, a rod sliding in the body of the control device, a cylinder opening into said body, a piston carried by said rod and movable in said cylinder, means for actuating said sliding rod by the centrifugal governor in a direction opposite to that of the action of the air pressure upon the piston, a member movable inside the control device and pushed by the said rod in the direction corresponding to a decrease of the speed, a ball locking device between this movable member and this sliding rod disposed in a manner to render this movable member integral with this rod for one direction of the displacement of the rod corresponding to a decrease of the speed, means for locking the inlet valve in its open position by said movable member when the speed is sufficiently high, a spring provided in a manner to close the inlet valve when the latter is set free by the said member on the occurrence of a decrease of the speed, a flexible diaphragm forming one of the walls of the body of the control device, a rod integral with the inlet valve, the end of said rod contacting the inner face of said diaphragm, an adjustable spring acting on the outer face of said diaphragm in a manner to maintain the inlet valve open when the brake is released, means for coupling the said movable member to the outlet valve of the control device with an amount of play enabling said inlet valve to be unlocked before the opening of the outlet valve, a shaft alined with the rod sliding in the body of the control device and carrying the centrifugal governor, this shaft being fixed with said rod for axial displacements only and free to rotate in respect of said rod, driving means provided between said shaft and the wheel of the car.

GEORGES EMILE HOUPLAIN.